Feb. 3, 1925.
H. A. MIDDAUGH
FISHWAY
Filed July 7, 1924
1,524,667
2 Sheets-Sheet 1
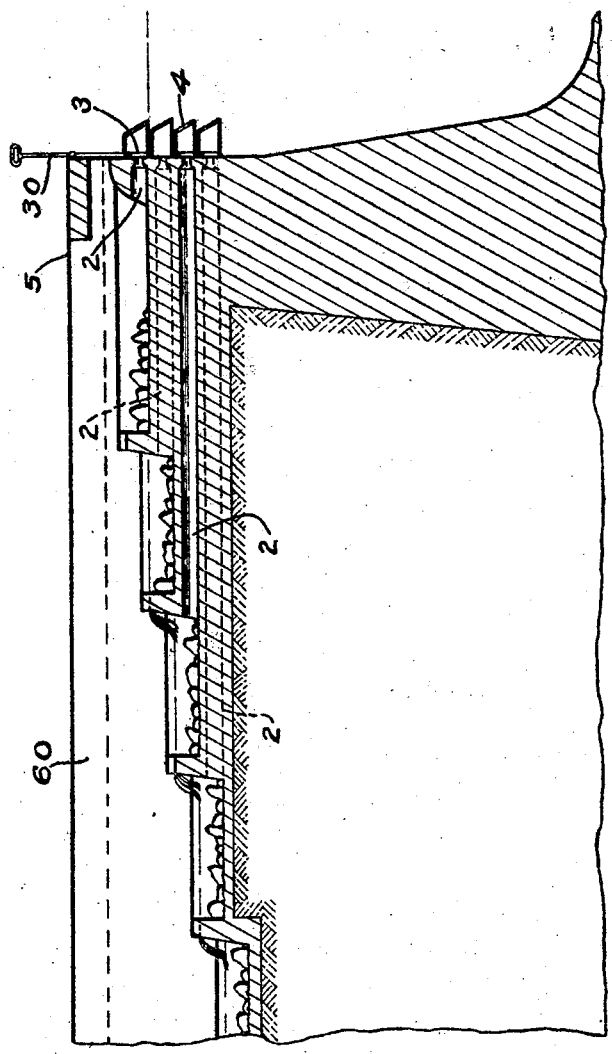
Fig 1
Inventor
Horace A. Middaugh
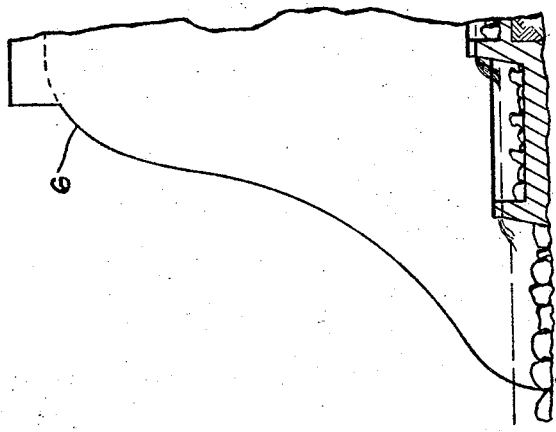
Attorneys

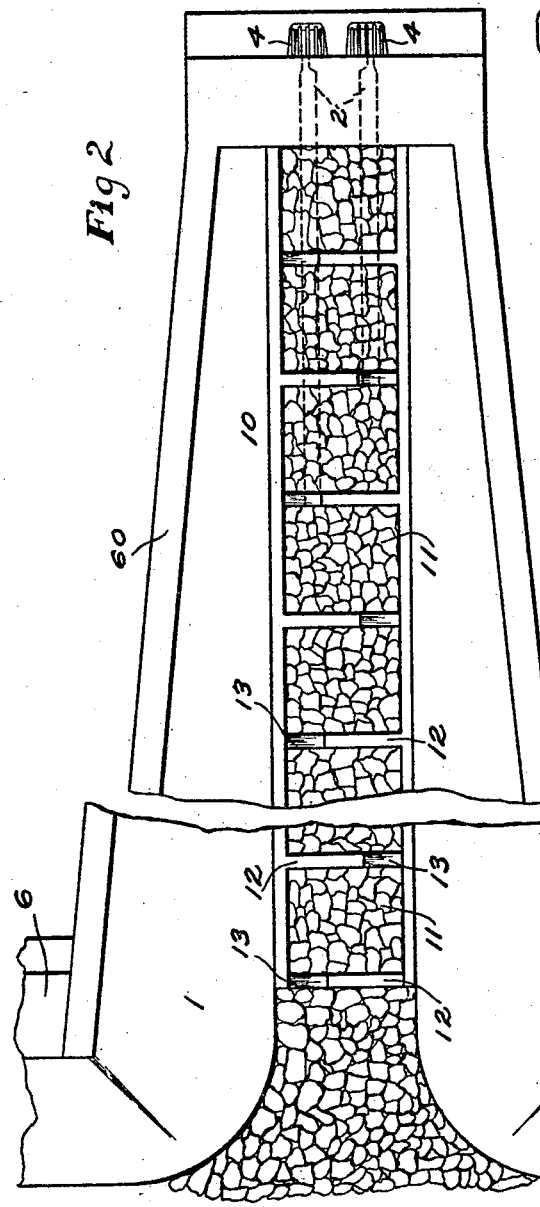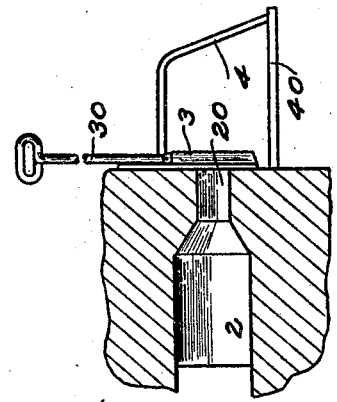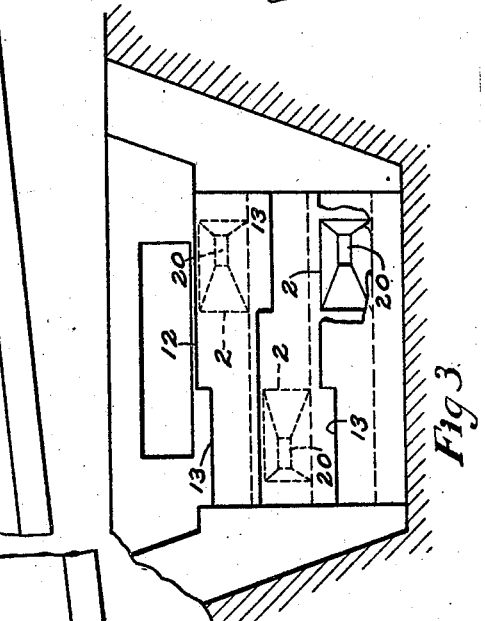

Patented Feb. 3, 1925.

1,524,667

UNITED STATES PATENT OFFICE.

HORACE A. MIDDAUGH, OF SEATTLE, WASHINGTON.

FISHWAY.

Application filed July 7, 1924. Serial No. 724,564.

*To all whom it may concern:*

Be it known that I, HORACE A. MIDDAUGH, a citizen of the United States of America, and resident of the city of Seattle, in the county of King and State of Washington, have invented certain new and useful Improvements in Fishways, of which the following is a specification.

My invention relates to fishways or devices by which fish are enabled to overcome elevations produced by dams, falls, and the like, in streams.

The object of my invention is to produce a more efficient device than those already in use, and one which will enable the fish to overcome falls and dams of greater altitude than those which they have been able to surmount by previously existing devices.

My invention consists in the provision of a series of pools connected by short falls and a provision whereby the device may be made easily adapted for use with a considerable variation in the surface elevation of the reservoirs or pools at the upper end of the dam or fall.

Other objects of my invention may be ascertained by a study of the following specification and reference to the drawings.

Figure 1 is a sectional elevation taken lengthwise of my device, which direction would ordinarily be transverse the dam or in a direction extending up and down the stream.

Figure 2 is a plan view of a fish way embodying my invention.

Figure 3 is an elevation showing a section of the fishway at its upper end.

Figure 4 is a transverse section showing the upper end of the fishway and the manner of providing adjustable exits for the fish into the pool.

It is a peculiarity of anadromous fish to persistently swim up stream during the spawning season. This causes them at all times to swim against the current. Therefore, to make any fishway or fish ladder effective for such fish, it is necessary to have the entrance thereto located at the highest point of the stream accessible to the fish before meeting the obstruction. Having this in mind I locate the entrance to my fishway at the face of the dam or falls, or as near thereto as possible. It would, in effect, be desirable, if this were possible, to locate the entrance in a slight bay extending into the dam.

In the drawings, 6 represents the wall of a dam. In this a slight bay 1 is shown in which is located the lower end of the fishway. In the fishway are formed a series of pools 11 by means of transverse walls 12. Preferably these walls are provided near one end with a section 13 which is slightly lowered in height as compared with the remainder. Such a sufficient amount of water flowing down the fishway, water may flow over the more elevated portion of the wall 12, but when the flow of water is limited it may be entirely confined to the short section 13.

The difference in elevation between the successive pools may be made whatever experience shows will be easily overcome by the fish. The size of the pools is such that the flow of water therein is very slight, thus providing resting places for the fish preceding their leap to the next pool above.

In the above respect my fishway in a general way resembles fishways which have been previously proposed. It however differs from other fishways in having its entrance located either at or slightly above the lower face of the dam, thus greatly increasing the probabilities that the fish will find the entrance. Anadromous fish, in ascending a stream and coming to a dam or fall, will collect in the pool below the dam and will swim back and forth across the river, hunting for a place where their ascent can be continued. In doing this they will enter the bay in the dam and, finding quiet water, will eventually find the slight fall pouring over the gap 13 in the lowermost transverse wall of the fishway. They will be enabled to leap from the pool at the base of the fishway into the fish pool 11, and from this, in succession, into the pools above. The fish may rest in any of these pools before leaping into the next.

To make a fishway thoroughly practical for all conditions, it must be so designed that it will accommodate itself to variations in level of the water in the reservoir or pool above the dam or fall. In consequence I have provided means whereby the fish may pass from any one of several pools located at the upper end of the fishway, into the body of water above the dam. To this end I have provided tunnels 2, extending from each of several of the uppermost pools to and opening into the pool above the dam. I have also provided gates, as 3, which may be opened or closed at will so that the upper outlet of these tunnels may be closed when desired.

It is the intention that the gates covering the outlets of these tunnels will be closed excepting for one, or possibly two, of those which are nearest to the surface of the water in the pool above the dam. The outlet 20 from the tunnel 2 into the pool above the dam, is preferably made much smaller in cross section than the cross section of the main tunnel. The flow of water in the tunnel proper is thus reduced considerably and as a slight downward flow is maintained therein, the natural tendency of the fish to swim against the current causes it to enter the tunnel and swim to its upper end. This it can do without materially exerting itself. When, however, it reaches the upper end it must make a slight spurt to pass through the opening 20.

As the water in the pool above the dam lowers, the gates 3 are opened in succession so as to keep at least one, and possibly two, open at all times. To prevent debris from blocking the entrances 20, gratings consisting of bars 4 and 40 are placed in front of this entrance. The lower side of this grating should be freely open, and for this reason I prefer to have the bar 40 to which the vertical bars 4 are connected, merely a frame extending about the outer edges of the grated area so that the fish, after passing through the opening 20, may swim downward and under the grating.

The side walls 60 of the fishway may be made of whatever size and weight is necessary to restrain the pressure of the water above the dam. A suitable location for such a fishway would often place it at the end of the dam, in which case it might be located in a cut in the bank. The location of the fishway is immaterial except that it must comply with the requirements first mentioned, that its entrance is at the lower face of the dam.

What I claim as my invention is:

1. A fishway having a series of stepped pools, tunnels leading from certain of the uppermost pools to inlets communicating with the pool above the dam or fall, and means for closing such of the inlets as desired.

2. A fishway having stepped pools, tunnels leading from certain of the uppermost pools and having inlets communicating with the pool above the fishway, said inlets being of much smaller area than that of the tunnels, and means for closing said inlets as desired.

3. A fishway comprising a series of stepped pools, the walls between the pools having overflows alternately at opposite sides of the fishway, certain of the upper pools having tunnels communicating with the pool above the fishway at levels corresponding with the level of said pools and by openings of reduced area compared with the area of the tunnels, and means for closing said inlet openings at will.

Signed at Seattle, King County, Washington, this 30th day of June 1924.

HORACE A. MIDDAUGH.